(12) United States Patent
Parish et al.

(10) Patent No.: US 11,852,261 B2
(45) Date of Patent: Dec. 26, 2023

(54) VALVE WITH EXCHANGEABLE PACKING SEAL CARTRIDGE

(71) Applicant: Flowserve Pte. Ltd., Singapore (SG)

(72) Inventors: Paul Jeffrey Parish, Spanish Fork, UT (US); Michael P. Nelson, Lehi, UT (US); Ivica Radman, Kaernten (AT)

(73) Assignee: Flowserve Pte. Ltd., Singapore (SG)

( * ) Notice: Subject to any disclaimer, the term of this patent is extended or adjusted under 35 U.S.C. 154(b) by 263 days.

(21) Appl. No.: 17/485,678

(22) Filed: Sep. 27, 2021

(65) Prior Publication Data
US 2023/0101258 A1    Mar. 30, 2023

(51) Int. Cl.
| | |
|---|---|
| *F16K 41/02* | (2006.01) |
| *F16K 41/04* | (2006.01) |
| *F16K 1/36* | (2006.01) |
| *F16K 1/46* | (2006.01) |
| *F16K 1/42* | (2006.01) |

(52) U.S. Cl.
CPC ............... *F16K 41/02* (2013.01); *F16K 1/36* (2013.01); *F16K 1/46* (2013.01); *F16K 1/422* (2013.01); *F16K 41/04* (2013.01)

(58) Field of Classification Search
CPC .... F16K 5/0285; F16K 5/0485; F16K 5/0694; F16K 3/0227; F16K 3/0236; F16K 41/02; F16K 41/04; F16K 41/06; F16K 1/46; F16K 31/122; F16K 31/1221
See application file for complete search history.

(56) References Cited

U.S. PATENT DOCUMENTS

| | | | |
|---|---|---|---|
| 1,569,336 A * | 1/1926 | Roesch .................... | F16K 41/02 137/79 |
| 4,289,317 A | 9/1981 | Kuc | |
| 4,566,273 A * | 1/1986 | Baumeler ............. | F16K 31/122 60/407 |

(Continued)

FOREIGN PATENT DOCUMENTS

| | | | | |
|---|---|---|---|---|
| CN | 105443782 A | * | 3/2016 | ............... F16K 1/36 |
| CN | 107355551 A | * | 11/2017 | |
| CN | 110307345 A | | 10/2019 | |

(Continued)

OTHER PUBLICATIONS

International Search Report & Written Opinion for PCT Application No. PCT/US2022/43358.

*Primary Examiner* — Hailey K. Do
(74) *Attorney, Agent, or Firm* — Maine Cernota & Curran

(57) ABSTRACT

A valve includes at least one valve stem seal, such as a packing seal, that is included in a removable seal cartridge. The valve stem is connected to the actuator via a linkage, which can be removed to provide a linkage gap between the actuator and the valve stem. The seal cartridge can then be slid along the valve stem into the linkage gap and laterally removed from the valve, whereupon the seals within the seal cartridge can be refurbished. The valve can be a rotary or linear valve. In embodiments, the linkage gap can be increased by linear displacement of the actuator away from the valve stem. The seal cartridge can be re-installed in the valve after refurbishment, or a substantially identical replacement seal cartridge can be provided, and can be installed in the valve in replacement of the removed seal cartridge, thereby minimizing downtime of the valve.

16 Claims, 10 Drawing Sheets

(56) References Cited

U.S. PATENT DOCUMENTS 4,601,304 A 7/1986 Schobl
6,302,374 B1 * 10/2001 Fink .................. F16K 41/02
251/368

FOREIGN PATENT DOCUMENTS

KR 200277487 Y1 6/2002
KR 1020210054937 A 5/2021

* cited by examiner

VALVE WITH EXCHANGEABLE PACKING SEAL CARTRIDGE

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to valves, and more particularly, to valves that include packing seals.

BACKGROUND OF THE INVENTION

Valves are widely used for controlling the flow of a fluid through a pipe or conduit. In general, most valves include a valve seat and a valve plug located within a valve body of the valve, where the valve plug includes a valve stem that is somehow coupled to a valve actuator. Typically, the valve stem extends into a valve "bonnet" that is attached and sealed to the valve body. Most valves are either rotary valves, in that the valve plug is rotated within the valve seat by the valve actuator, or linear valves in which the valve plug is shifted toward or away from the valve seat in a linear fashion.

Generally, it is necessary to ensure that process fluid does not leak along the valve stem and out of the valve, while ensuring that the valve stem can be rotated and/or slid without undue obstruction. The most widely used approach is to form a seal about the valve stem using one or more "packing" seals. Packing seals include rope-like lubricated seal materials that wrap around the valve stem, filling in dead spaces and forming a seal with the valve stem. Over time, however, as the packing material begins to wear down and the lubrication degrades, leakage of process fluid past the packing seal may occur. If the process fluid is a liquid at high temperature, but solidifies at colder temperatures, a leak in the packing can cause the normally liquid process fluid to cool and solidify in the packing bore, causing the valve to seize and rendering the valve inoperable. Preventative measures against such leakage can include regular re-lubrication of the packing material, and eventual refurbishing or replacement of the valve.

In cases where it is inconvenient or expensive to replace a valve, it is often preferable to refurbish the packing seals periodically. However, while refurbishing the packing seals of a valve will avoid the expense of purchasing an entire replacement valve, nevertheless the cost of refurbishment can be high, not only due to the refurbishment itself, but also due to lost productivity during the time the valve is out of service while it is being refurbished. Accordingly, it can be desirable to refurbish the packing seals of a valve as quickly as possible.

Unfortunately, refurbishing the packing seals of a valve can be complex and time consuming. For example, to access the packing seals it is often necessary to disassemble and/or remove various other parts of a valve that are unrelated to the packing seals, such as the valve actuator, the bonnet, and/or various valve accessories. Also, it can be difficult to change out worn and leaky valve packing. For example, packing rings can become embedded deep in a packing bore and can be difficult to extract, especially when the process fluid is sticky or solidified. And if the packing bore has become damaged, further repairs and/or replacements may be necessary.

What is needed, therefore, is a valve design that enables its packing seals to be quickly and easily replaced.

SUMMARY OF THE INVENTION

The present invention is a valve design that enables its packing seals to be quickly and easily replaced.

According to the present invention, the valve stem of a valve is sealed by one or more packing seals that surround the valve stem, for example within a gland area of the valve. Easy and rapid removal of the packing seals from the valve is enabled by including the packing seals within a removable seal cartridge. In various embodiments, the seal cartridge also includes one or more of valve stem guides, spacers, a gland follower, a gland flange, and live-load springs.

According to the present invention, the actuator is connected to the valve stem via a removable linkage, sometimes referred to herein as a valve stem clamp, which is configured to transfer linear and/or rotary movements of the actuator to the valve stem during normal operation of the valve. Because the valve stem clamp is located beyond the packing seals, it need not be enclosed within a housing, but can be laterally accessible without disassembly of any components of the valve. Or a simple and easily removed cover can be provided, such as a split cover, that serves to keep dirt and debris away from the actuator without unduly inhibiting lateral access to the seal cartridge.

When removal of the seal cartridge is desired, the valve stem clamp is removed from the valve, and then the seal cartridge is disconnected from the bonnet and slid along the axis of the valve stem into the linkage gap that was formerly occupied by the valve stem clamp, until the seal cartridge is beyond the valve stem and can be removed laterally from the valve. Once the seal cartridge is free of the valve, it can be easily and quickly refurbished at an appropriate facility. In addition, an identical, new or previously refurbished seal cartridge can be provided that can immediately be reinstalled into the valve, so that the valve continues in operation as the original seal cartridge is being refurbished. Subsequently, the newly refurbished seal cartridge can be held in readiness until the next cartridge exchange is needed. As a result, replacement of the packing seals is quick and easy, and downtime of the valve is minimized.

In some embodiments the valve stem clamp is sufficiently long such that the single step of removing the valve stem clamp provides a linkage gap above the valve stem that is longer than the seal cartridge. In other embodiments, where the valve design accommodates linear sliding of the actuator relative to the valve stem, the valve stem clamp can be shorter than the seal cartridge, and the difference in lengths can be made up by sliding the actuator away from the seal cartridge, thereby providing additional space for the seal cartridge to be slid beyond the valve stem.

The present invention thereby enables the packing seals to be removed from the valve without removing the actuator. Furthermore, replacing the seal cartridge does not require disassembly of the bonnet from the valve, and therefore does not require replacement of a larger bonnet gasket, which would typically be more expensive than the smaller gasket that seals the seal cartridge to the bonnet. The present invention therefore allows for quicker replacement of the seal packing material, in that the packing material is preinstalled in the seal cartridge before the seal cartridge is installed in the valve. If the packing configuration is complicated, this reduces the chance of an improper packing arrangement. The present invention thereby reduces maintenance costs, because the packing replacement is rapid, and the seal cartridge is less expensive than the bonnet. It should also be noted that in the present invention the packing bore, i.e. the outer bore that surrounds the packing, is in the seal cartridge, and not in a more expensive bonnet. Accordingly, if the packing bore is damaged, it is only necessary to replace the seal cartridge, rather than replacing the more expensive bonnet.

A first general aspect of the present invention is a valve that includes a valve seat within a valve body, a valve plug configured to control a flow of process fluid through the valve body according to a separation between the valve plug and the valve seat, and/or according to a rotational position of the valve plug within the valve seat, a valve stem in mechanical communication with the valve plug, an actuator, a removable valve stem linkage that provides mechanical linkage between the actuator and the valve stem, so that rotational and/or liner displacement of the actuator is transferred to the valve stem, and a seal cartridge comprising a cartridge housing that is removably attached to the valve body, and at least one seal that surrounds the valve stem and forms a seal between a cartridge housing and the valve stem, while permitting at least one of linear and rotational movement of the valve stem relative to the seal cartridge, wherein, upon removal of the removable valve stem linkage, an unobstructed linkage gap is provided between the actuator and the valve stem, and wherein, upon disconnecting of the cartridge housing from the valve body, the seal cartridge can be slid along the valve stem into the linkage gap until the seal cartridge no longer surrounds the valve stem and can be laterally removed from the valve.

In some embodiments the valve is a rotational valve, while in other embodiments the valve is a linear valve.

In any of the above embodiments, at least one of the seals can be a packing seal.

In any of the above embodiments, the valve stem linkage can function as a clamp that clamps a lower portion of the actuator within an upper portion of the valve stem linkage, and clamps an upper portion of the valve stem within a lower portion of the valve stem linkage.

Any of the above embodiments can be configured such that lateral access to the valve stem linkage does not require removal of any components of the valve, or such that lateral access to the valve requires, at most, removal of a valve cover, said removal requiring no other disassembly of the valve.

In any of the above embodiments, the seal cartridge can further include at least one of a valve stem guide, a spacer, a gland follower, a gland flange, and a live-load spring.

In any of the above embodiments, a length of the valve stem linkage can be sufficient such that removal of the valve stem linkage is sufficient to enable removal of the seal cartridge from the valve.

In any of the above embodiments, the valve can permit linear movement of the actuator, and a combination of removing the valve stem linkage and linearly displacing the actuator away from the valve stem can be sufficient to enable removal of the seal cartridge from the valve.

In any of the above embodiments, a bottom of the cartridge housing can be affixed to a top of a bonnet of the valve housing, such that the seal cartridge extends above the bonnet.

In any of the above embodiments, an upper flange of the top of the cartridge housing can be attached to a top of a bonnet of the valve housing, such that the seal cartridge extends into the bonnet.

A second general aspect of the present invention is a method of refurbishing at least one valve stem seal included within a valve. The method includes providing a valve according to the first general aspect, removing the valve stem linkage, detaching the seal cartridge from the valve body, sliding the valve cartridge along the valve stem until it no longer surrounds the valve stem, laterally removing the seal cartridge from the valve, and refurbishing the at least one seal that is included in the seal cartridge.

In embodiments, the method further includes translating the actuator away from the valve stem, thereby increasing the linkage gap.

Any of the above embodiments can further include refurbishing the at least one seal included in the seal cartridge. In some of these embodiments the method further includes, after refurbishing the seal cartridge, re-installing the seal cartridge in the valve, and then reinstalling the valve stem linkage in the valve.

Any of the above embodiments can further include providing a replacement seal cartridge, after removing the seal cartridge from the valve, installing the replacement seal cartridge in the valve, and reinstalling the valve stem linkage in the valve.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a valve design that enables its packing seals to be quickly and easily replaced.

Figure 1:
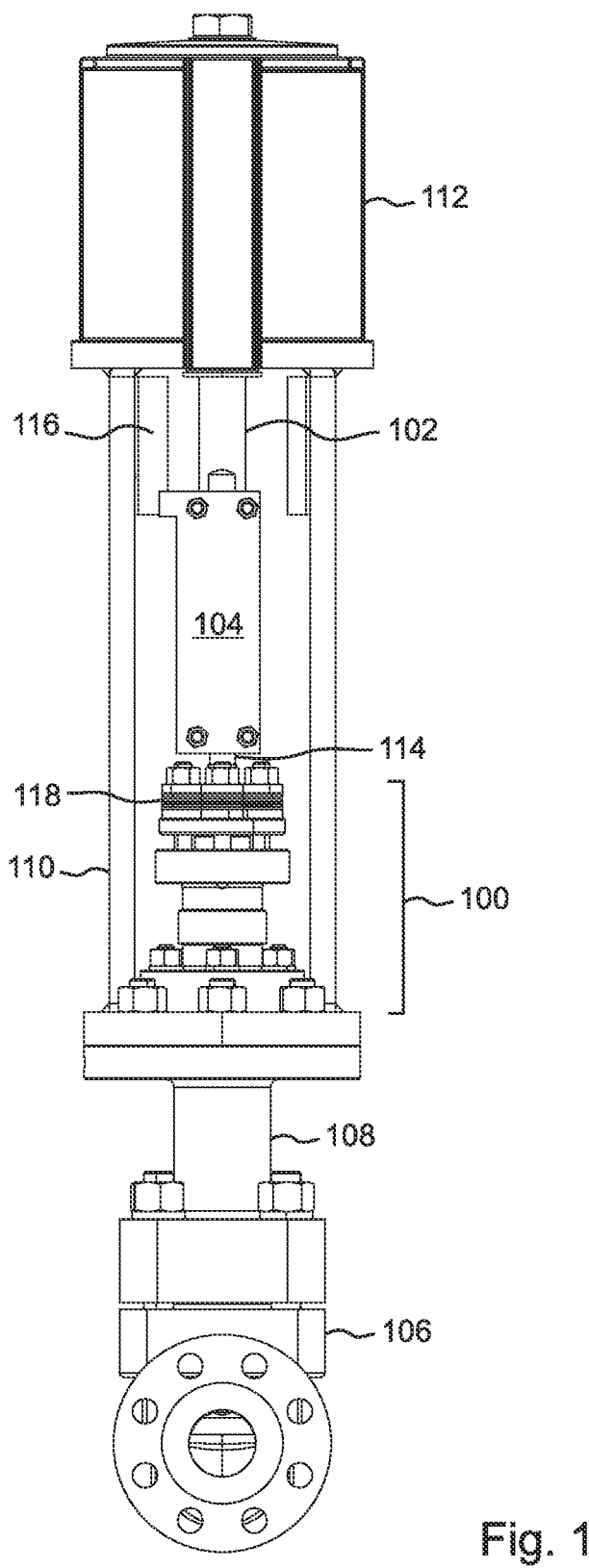
FIG. 1 is a side view, drawn to scale, of an embodiment of the present invention.
Figure 2:
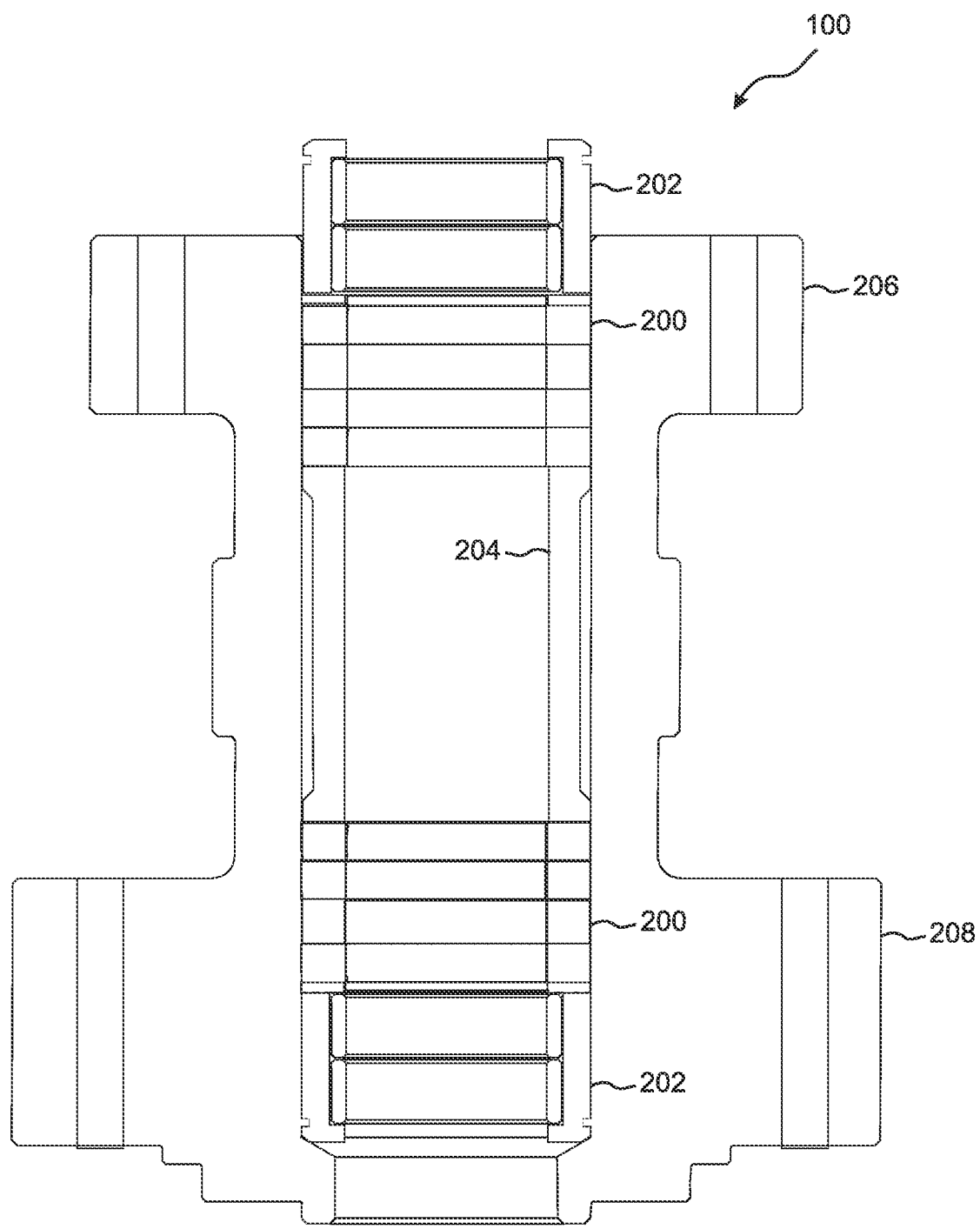
FIG. 2 is a sectional view, drawn to scale, of the seal cartridge in an embodiment of the present invention, shown separated from the valve.

With reference to FIGS. 1 and 2, according to the present invention the valve stem 114 of a valve is sealed by one or more packing seals 200 that surround the valve stem 114, for example within a gland area of the valve. Easy and rapid removal of the packing seals 200 from the valve is enabled by including the packing seals 200 as part of a removable seal cartridge 100. In the embodiment of FIG. 2, the seal cartridge 100 further includes valve stem guides 202, spacers 204, an upper cartridge flange 206, and a lower cartridge flange 208.

According to the present invention, the actuator 102 is connected to the valve stem 114 via a removable linkage 104, sometimes referred to herein as a valve stem clamp 104. In the illustrated, exemplary embodiment the valve stem clamp 104 is configured to transfer linear movements of the actuator 102 to the valve stem 114. To this end, a valve stem guide 116 is provided that prevents undue rotation of the valve stem clamp 104, and hence of the valve stem 114 and actuator 102, as the assembly is slid up and down. In other embodiments, the valve stem clamp 104 is configured to transfer rotary movements of the actuator 102 to the valve stem 114. In general, the valve stem clamp 104 can be configured to transfer both linear and rotary movements of the actuator to the valve stem 114.

The valve stem clamp 104 is located beyond, i.e. above, the seal cartridge 100, and in the embodiment of FIG. 2 it is not enclosed within a housing, and is laterally accessible without disassembly of any components of the valve. In other embodiments, a simple and easily removed cover (not shown) is provided, such as a split cover, that serves to keep dirt and debris away from the actuator without unduly inhibiting lateral access to the seal cartridge 100. Also visible in FIG. 1 are the valve body 106, the bonnet 108, live load springs 118, and an actuator yoke 110. The valve of FIG. 1 is a linear valve, and further includes a spring housing 112 within which a spring (302 in FIG. 3) applies upward linear force to the actuator, thereby causing the valve of FIG. 1 to be "normally open" if no other force is applied to the actuator.

Figure 3A:
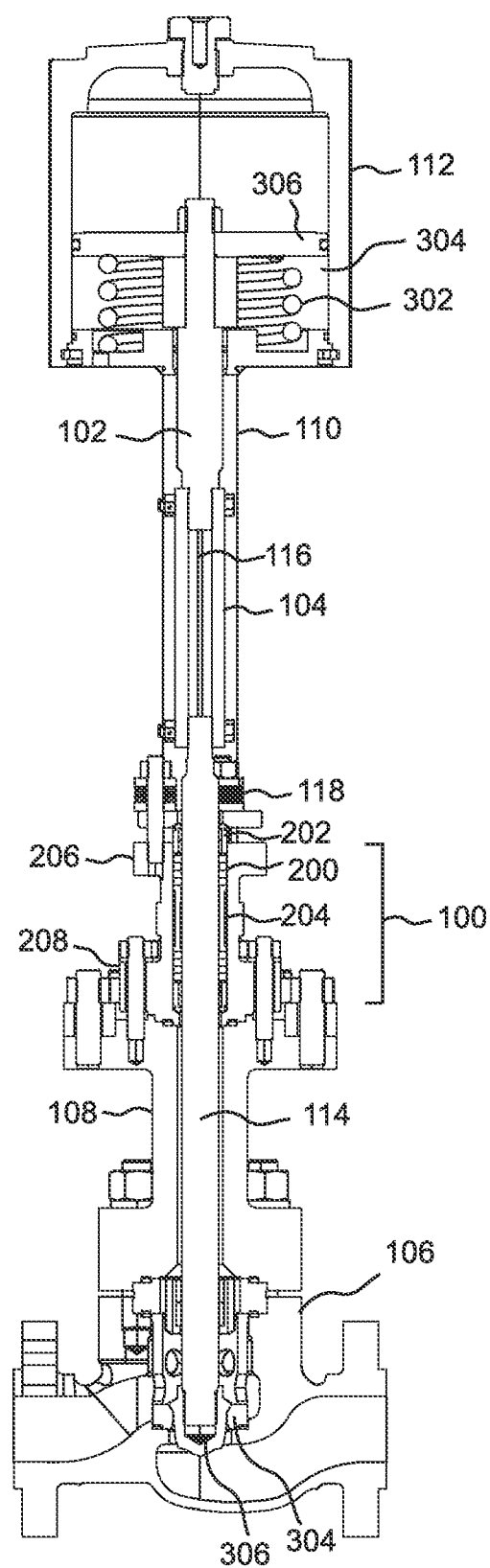
FIG. 3A is a front, sectional view, drawn to scale, of the valve of FIG. 1.
Figure 3B:
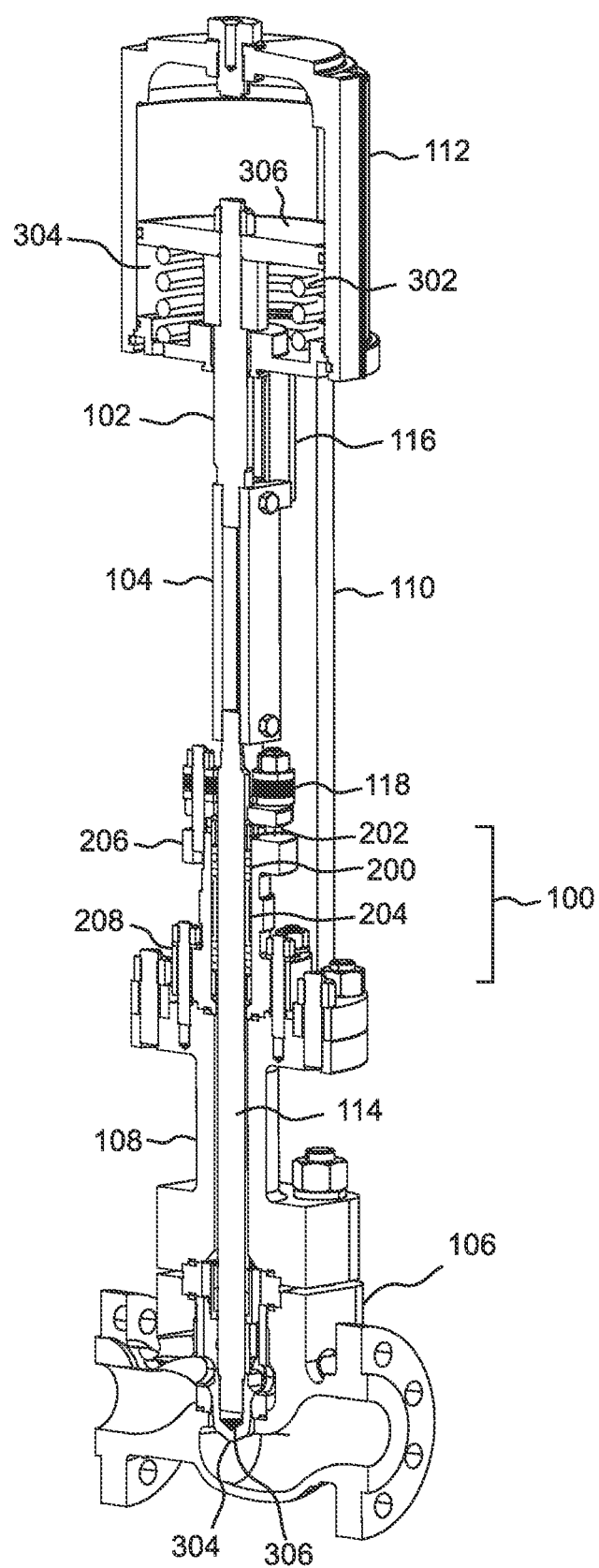
FIG. 3B is an oblique view, drawn to scale, of the sectional view of FIG. 3A, shown as rotated about the central axis of the valve stem.
Figure 4:
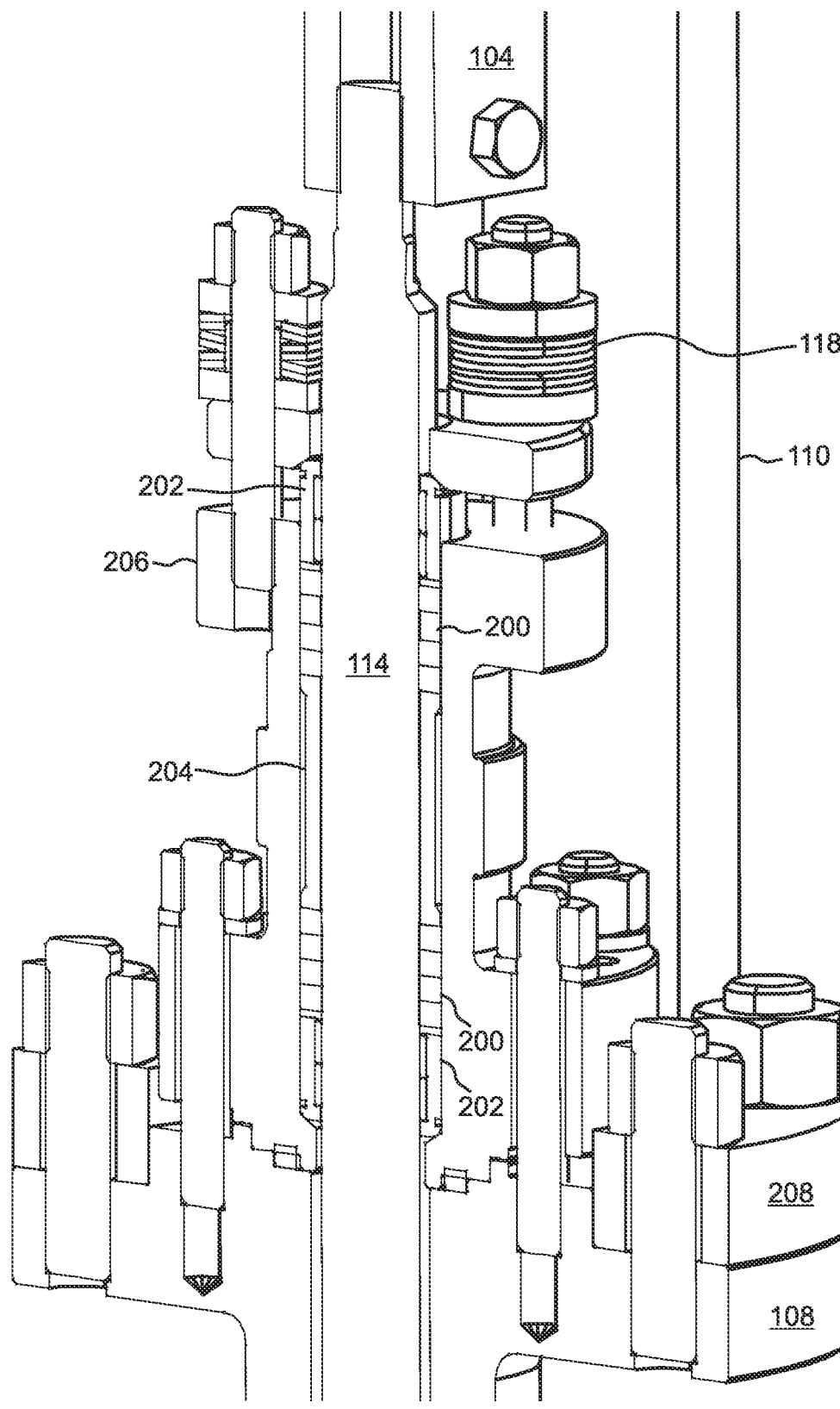
FIG. 4 is a close-up view, drawn to scale, of the portion of the valve of FIG. 3B that contains the seal cartridge.
Figure 5A:
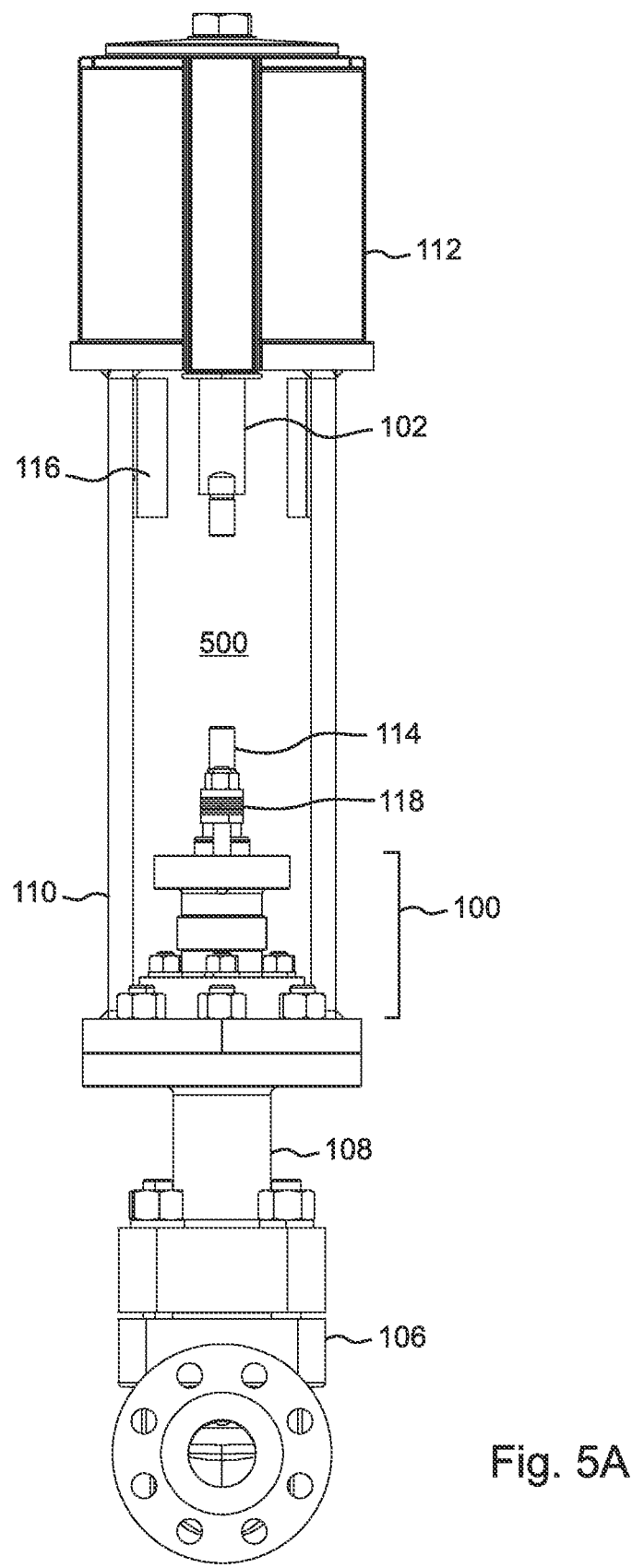
FIG. 5A is a side view, drawn to scale, of the valve of FIG. 1 shown after the valve stem clam has been removed from the valve.
Figure 5B:
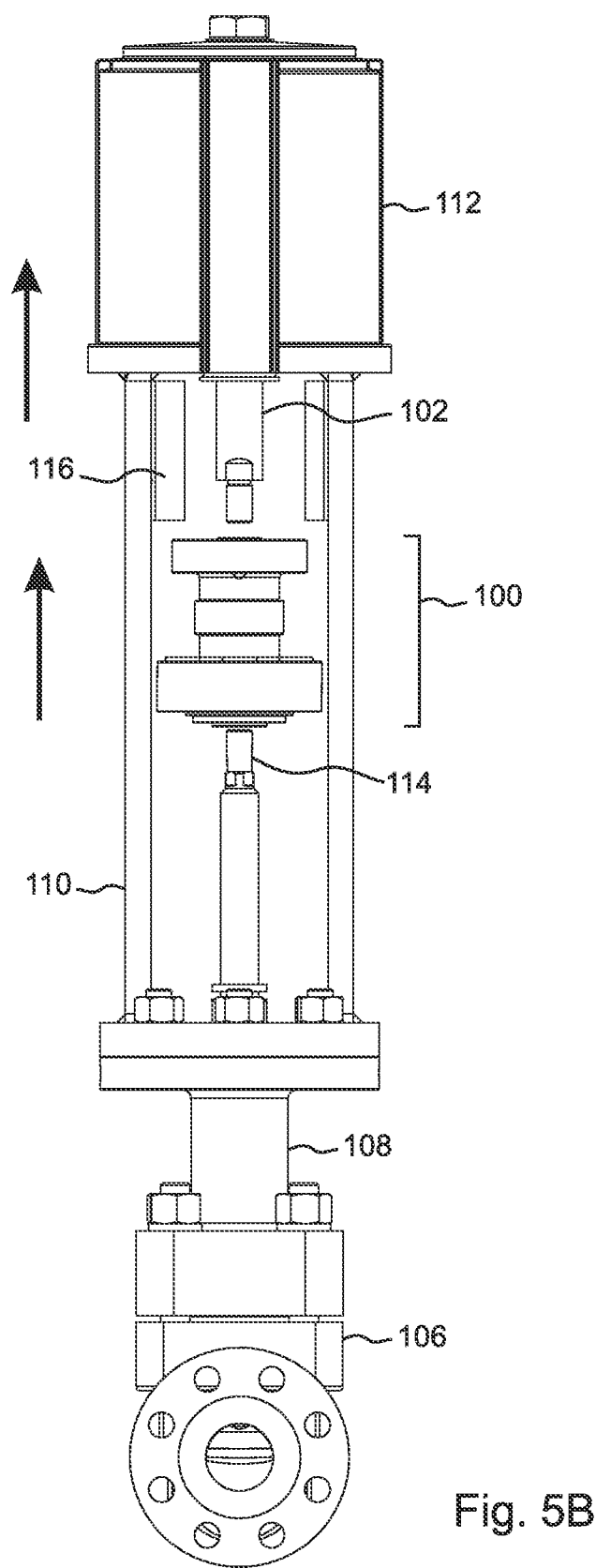
FIG. 5B is a side view, drawn to scale, of the valve of FIG. 5A, shown after the seal cartridge has been slid into the linkage gap.
Figure 5C:
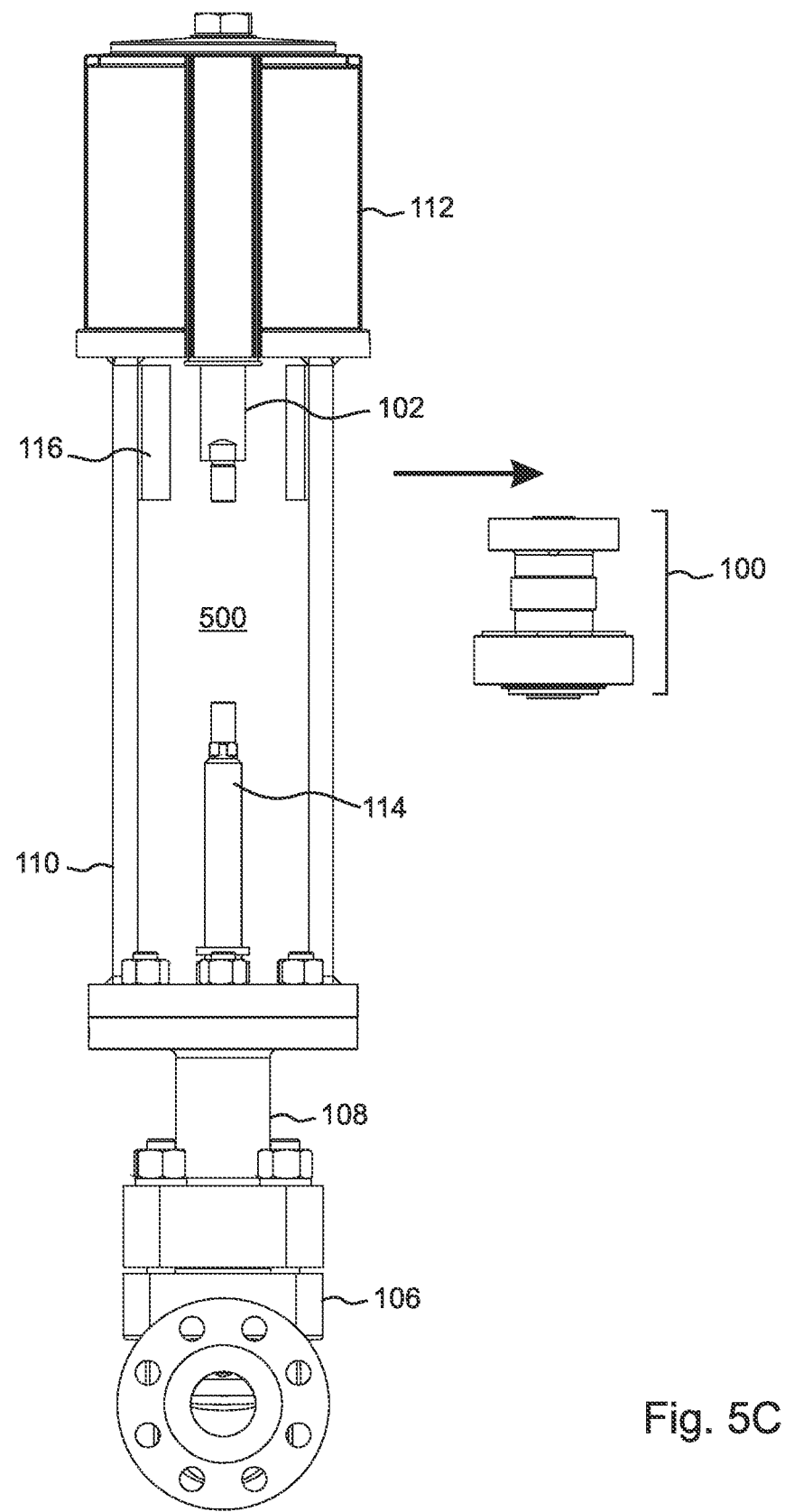
FIG. 5C is a side view, drawn to scale, of the valve of FIG. 5B shown with the seal cartridge removed laterally from the valve.

FIG. 3A is a front sectional view of the embodiment of FIG. 1, where the sectional plane is taken at right angles to the front view plane of FIG. 1. FIG. 3B is a rotated view of the sectional view of FIG. 3A. In these sectional views, the spring 302 can be seen within the spring housing 112, which terminates at a spring plate 306, forming a space 304 that surrounds the spring and is bounded by the spring plate 306 and the bottom of the spring housing 112. These sectional drawings further illustrate the structure of the valve stem clamp 104 as being a pair of plates that are bolted together, with the bottom end of the actuator being sandwiched between the plates at the top of the valve stem clamp 104, and the top end of the valve stem being sandwiched between the plates at the bottom of the valve stem clamp 104. FIG. 4 is a close-up sectional view of the region of FIG. 3A in which the seal cartridge 100 is mounted When removal of the seal cartridge is desired, the valve stem clamp 104 is removed from the valve, as shown in FIG. 5, leaving an unobstructed linkage gap 500 between the actuator 102 and the valve stem 114. Then the seal cartridge 100 is disconnected from the bonnet 108 and slid along the axis of the valve stem 114 into the linkage gap 500 that was formerly occupied by the valve stem clamp 104, until the seal cartridge 100 is beyond the valve stem 114, as shown in FIG. 5B. Finally, the seal cartridge 100 is removed laterally from the valve, as shown in FIG. 5C.

Once the seal cartridge 100 is free of the valve, it can be easily and quickly refurbished at an appropriate facility. In addition, an identical, new or previously refurbished seal cartridge 100 can be provided that can immediately be reinstalled into the valve, so that the valve continues in operation as the original seal cartridge 100 is refurbished. As a result, replacement of the packing seals 200 is quick and easy, and downtime of the valve is minimized.

In some embodiments the valve stem clamp 104 is longer than the seal cartridge 100, such that removal of the valve stem clamp 104 provides a linkage gap 500 above the valve stem 114 that is longer than the seal cartridge 100. In the embodiment of FIGS. 5A-5C, the valve design accommodates linear sliding of the actuator 102 relative to the valve stem 114, and the valve stem clamp 104 is shorter than the seal cartridge 100, with the difference in lengths being made up in FIGS. 5B and 5C by sliding the actuator 102 upward and further away from the valve stem 114, thereby providing enough space 500 for the seal cartridge 100 to be slid beyond the valve stem 114. In the illustrated embodiment, this can be accomplished, for example, by pressurizing the space 304 within the spring housing 112 that is below the spring plate 306.

The present invention thereby enables the packing seals 200 to be removed from the valve without removing the actuator 102. Furthermore, replacing the seal cartridge 100 does not require disassembly of the bonnet 108 from the valve body 108, and therefore does not require replacement of a larger bonnet gasket, which would typically be more expensive than the smaller gasket that seals the seal cartridge 100 to the bonnet 108. The present invention therefore allows for quicker replacement of the seal packing material, in that the packing material is preinstalled in the seal cartridge 100 before the seal cartridge 100 is installed in the valve. If the packing configuration is complicated, this reduces the chance of an improper packing arrangement. The present invention thereby reduces maintenance costs, because the packing replacement is rapid, and the seal cartridge 100 is less expensive than the bonnet 108. It should also be noted that in the present invention the packing bore, i.e. the outer bore that surrounds the packing 200, is in the seal cartridge 100, and not in the bonnet 108. Accordingly, if the packing bore is damaged, it is only necessary to replace the seal cartridge 100, rather than replacing the more expensive bonnet 108.

Figure 6:
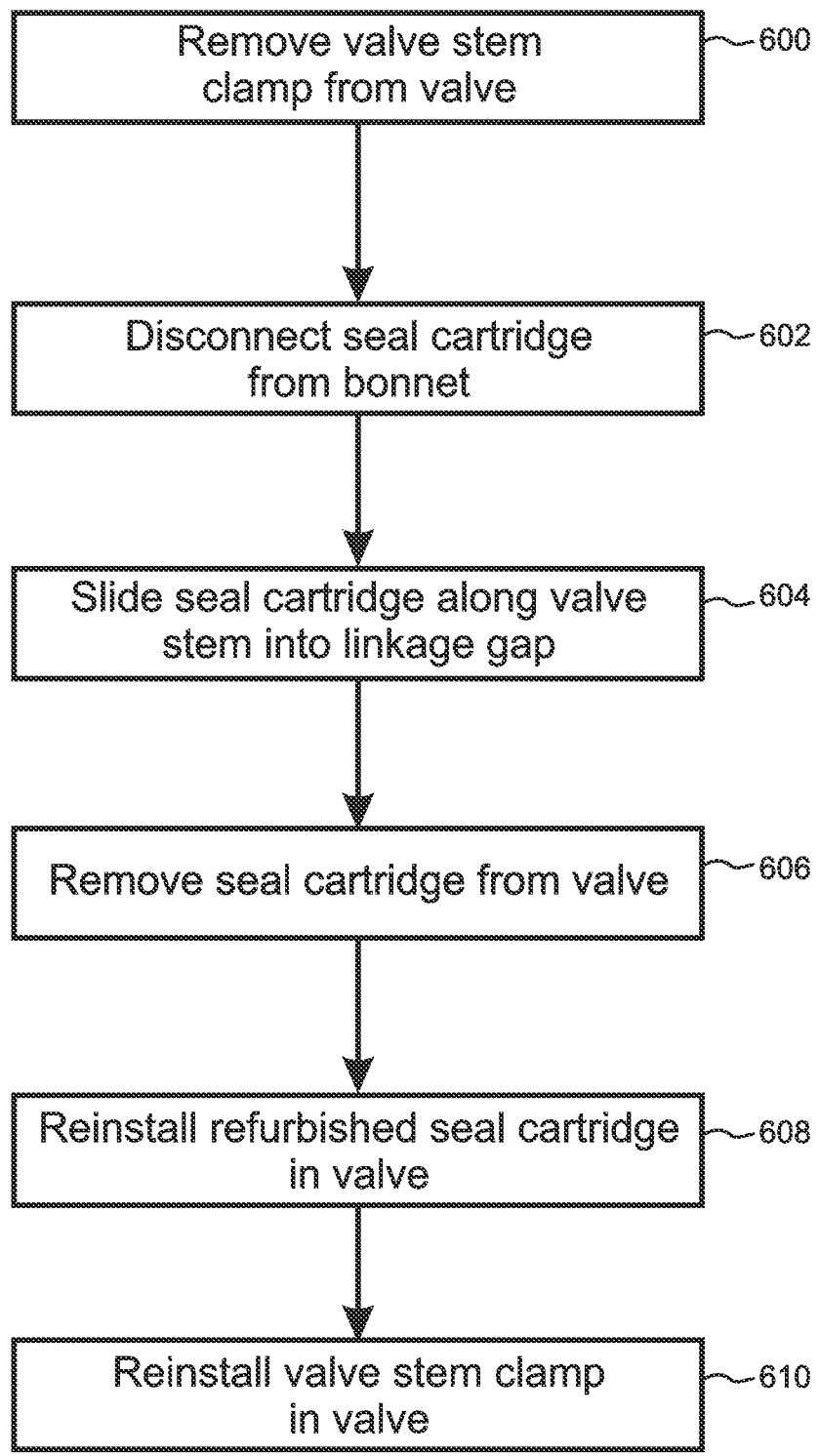
FIG. 6 is a flow diagram illustrating a method of the present invention.

The method described above is illustrated by the flow diagram of FIG. 6, where the method includes removing 600 the valve stem clamp 104 from the valve, thereby leaving an unobstructed linkage gap 500 between the valve stem and the actuator, disconnecting 602 the seal cartridge 100 from the bonnet 108, sliding 604 the seal cartridge 100 along the valve stem 114 into the linkage gap 500, removing 606 the seal cartridge 100 from the valve, reinstalling 608 a refurbished seal cartridge 100 in the valve, and reinstalling 610 the valve stem clamp in the valve, where the seal cartridge 100 that is reinstalled in the valve can be the same one that was removed, after refurbishment thereof, or a separate, replacement new or previously refurbished seal cartridge.

Figure 7:
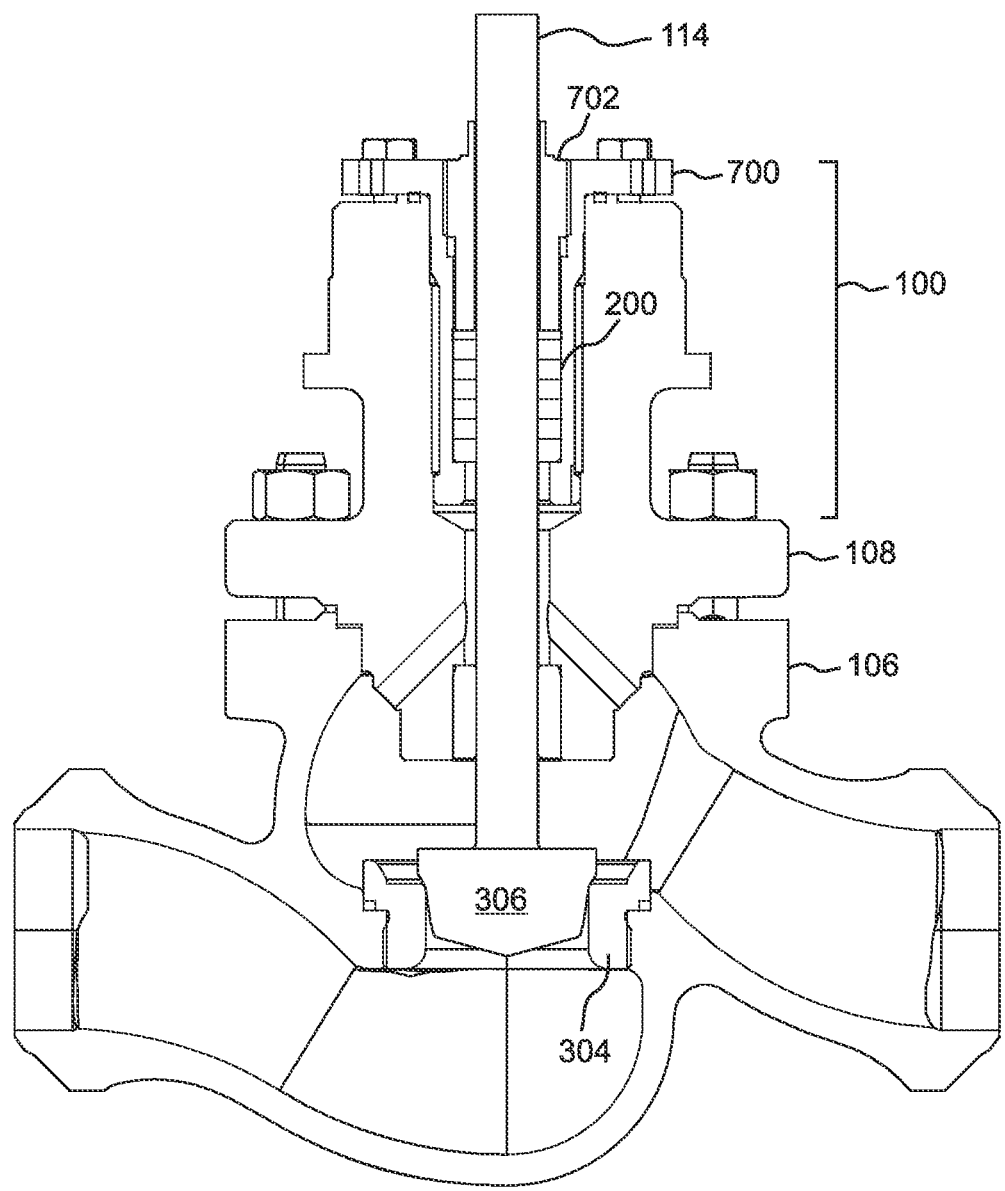
FIG. 7 is a cross-sectional diagram, drawn to scale, of an embodiment of the present invention wherein the seal cartridge is installed within the bonnet.

FIG. 7 is a cross-sectional diagram of the bonnet region of an alternative embodiment of the present invention. According to this embodiment, when the seal cartridge 100 is installed in the valve it extends into the bonnet 108, and is attached to the bonnet 108 by its upper flange 700. The embodiment further includes a "screw-in" packing follower 702.

It should be noted that, while the exemplary embodiment that is illustrated herein is actuated by a linear displacement of the valve stem, the present invention can be easily adapted by one of skill in the art to valves that are actuated by rotation of the valve plug within the valve seat, for example valves where the valve plug and valve seat are both penetrated by transverse passages that can be aligned or misaligned by rotation of the valve plug.

It should further be noted that usage herein of the term "valve stem clamp" does not require that the linkage between the actuator and the valve stem functions necessarily as a clamp. It is only required that the valve stem clamp provides physical communication between the valve stem and the actuator, and that the valve stem clamp can be easily removed without significant disassembly of the valve.

It should also be understood that the present invention is not limited to packing seals, but is applicable to refurbishing any type of seal in a valve, so long as the seal is slidable along the valve stem.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A valve comprising:
   a valve seat within a valve body;
   a valve plug configured to control a flow of process fluid through the valve body according to a separation between the valve plug and the valve seat, and/or according to a rotational position of the valve plug within the valve seat;
   a valve stem in mechanical communication with the valve plug;
   an actuator, the actuator being separated from the valve stem by a linkage gap;
   a removable valve stem linkage that bridges the linkage gap and provides a direct mechanical linkage between the actuator and the valve stem, so that rotational and/or linear displacement of the actuator is transferred to the valve stem; and
   a seal cartridge removably attached to the valve body and comprising at least one seal that surrounds the valve stem and forms a seal between the seal cartridge and the valve stem, while permitting at least one of linear and rotational movement of the valve stem relative to the seal cartridge;
   wherein, upon removal of the removable valve stem linkage, the linkage gap between the actuator and the valve stem is unobstructed; and
   wherein, upon disconnecting of the seal cartridge from the valve body, the seal cartridge can be slid along the valve stem into the unobstructed linkage gap until the seal cartridge no longer surrounds the valve stem and can be laterally removed from the valve without modifying the seal cartridge and without disassembling the actuator from the valve body.

2. The valve of claim 1, wherein the valve is a rotational valve.

3. The valve of claim 1, wherein the valve is a linear valve.

4. The valve of claim 1, wherein at least one of the seals is a packing seal.

5. The valve of claim 1, wherein the removable valve stem linkage functions as a clamp that clamps a lower portion of the actuator within an upper portion of the valve stem linkage, and clamps an upper portion of the valve stem within a lower portion of the valve stem linkage.

6. The valve of claim 1, wherein lateral access to the removable valve stem linkage does not require removal of any components of the valve.

7. The valve of claim 1, wherein the seal cartridge further comprises at least one of:
   a valve stem guide;
   a spacer;
   a gland flange; and
   a live-load spring.

8. The valve of claim 1, wherein removal of the removable valve stem linkage is sufficient to enable removal of the seal cartridge from the valve without displacing the valve stem and the actuator away from each other.

9. The valve of claim 1, wherein the valve permits linear movement of the actuator and valve stem, and wherein a combination of removing the removable valve stem linkage and linearly displacing the actuator and valve stem away from each other is sufficient to enable removal of the seal cartridge from the valve.

10. The valve of claim 1, wherein a bottom of the seal cartridge is affixed to a top of a bonnet of the valve housing, such that the seal cartridge extends above the bonnet.

11. The valve of claim 1, wherein an upper flange of the top of the seal cartridge is attached to a top of a bonnet of the valve housing, such that the seal cartridge extends into the bonnet.

12. A method of removing at least one valve stem seal included within a valve, the method comprising:
   providing a valve according to claim 1;
   removing the removable valve stem linkage;
   detaching the seal cartridge from the valve body;
   sliding the valve cartridge along the valve stem until it no longer surrounds the valve stem; and
   laterally removing the seal cartridge from the valve without modifying the seal cartridge and without disassembling the actuator from the valve body.

13. The method of claim 12, wherein the method further comprises translating the actuator and the valve stem away from each other, thereby increasing the linkage gap.

14. The method of claim 12, wherein the method further comprises:
   providing a replacement seal cartridge;
   after removing the seal cartridge from the valve, installing the replacement seal cartridge in the valve; and
   reinstalling the removable valve stem linkage in the valve.

15. The method of claim 12, further comprising refurbishing the at least one seal included in the seal cartridge.

16. The method of claim 15, wherein the method further includes, after refurbishing the seal cartridge, re-installing the seal cartridge in the valve, and then reinstalling the removable valve stem linkage in the valve.

* * * * *